H. E. COFFIN.
ENGINE VALVE CONSTRUCTION.
APPLICATION FILED SEPT. 29, 1910.
1,032,466.
Patented July 16, 1912.
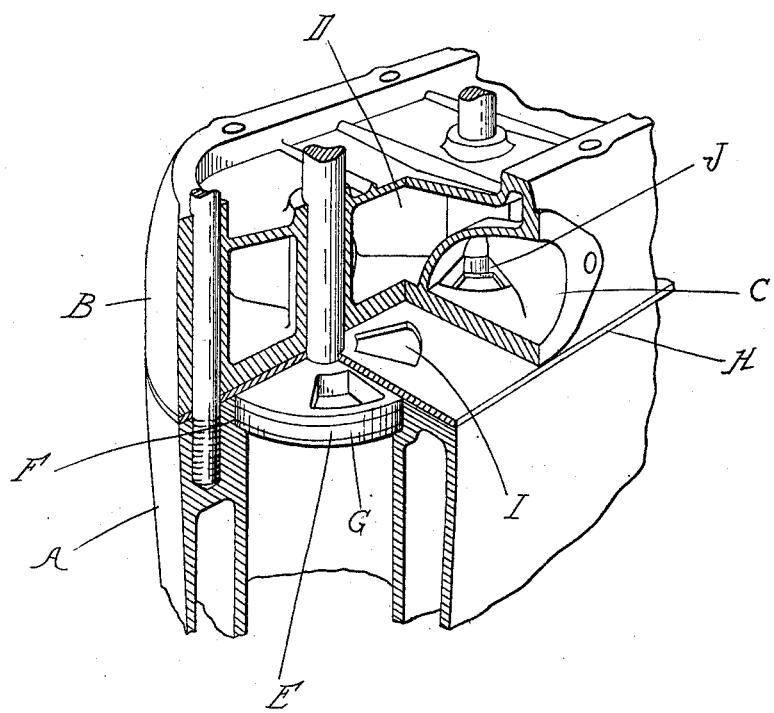
Witnesses
W. B. Ford
H. B. Belknap
Inventor
Howard E. Coffin
By Whittemore Hulbert Whittemore
Attorneys

UNITED STATES PATENT OFFICE.

HOWARD E. COFFIN, OF DETROIT, MICHIGAN.

ENGINE-VALVE CONSTRUCTION.

1,032,466.  Specification of Letters Patent.  Patented July 16, 1912.

Application filed September 29, 1910. Serial No. 584,425.

*To all whom it may concern:*

Be it known that I, HOWARD E. COFFIN, a citizen of the United States of America, residing at Detroit, in the county of Wayne and State of Michigan, have invented certain new and useful Improvements in Engine-Valve Construction, of which the following is a specification, reference being had therein to the accompanying drawings.

The invention relates to engine valve constructions and more particularly to valves for explosion engines.

It is one of the objects of the invention to facilitate the construction of the seat for the valve and to obtain accuracy in the location of the ports thereof.

To this end the invention consists in the construction as hereinafter set forth.

In the drawing the construction is represented in sectional perspective.

A is the casing of the engine, either of the single cylinder or multi-cylinder type.

B is a detachable head for the engine casing which is chambered to provide inlet and exhaust ports such as C, and a water jacket D.

E is a valve preferably a rotary valve which is seated upon the head B within the engine cylinder. This valve preferably engages counterbore F at the end of the engine cylinder which forms an annular shoulder or bearing for the inner face of the valve, and a peripheral packing ring G is preferably provided for forming a gas-tight joint.

To obtain accuracy in the location of the ports for the valve and to avoid the necessity of machining, the seat for the valve is preferably formed of a sheet metal plate H arranged between the casing A and the head B. This plate is preferably stamped and is provided with ports I accurately located by the stamping dies. The ports are arranged to register with ports J in the head B but the latter do not require machining as the timing of the valve is with respect to the ports I in the plate H. The inner face of the head B is however preferably machined to form a bearing for the plate H and if desired gaskets may be employed on one or both sides of said plate to make a more perfect gas proof joint. The necessity of this gasket is not as great on account of the packing of the disk valve by the peripheral ring E engaging the counterbore in the cylinder.

In addition to the advantage obtained by my construction in the perfect timing of the valve, there is the further advantage that any material desired may be used for the valve seat. Moreover the construction permits using a hardened ground plate and this when used will in a large measure be protected from the heat of the engine by the mass of the valve disk bearing thereagainst.

What I claim as my invention is:

1. The combination with an engine cylinder of a detachable ported head therefor, a valve within the cylinder and a stamped ported lining plate for said head defining the port area thereof.

2. The combination with an engine cylinder, of a ported head therefor, a valve for controlling the ports of said head, and a sheet metal ported stamping clamped between and positioned by said cylinder and head, and defining the port area of the latter.

3. The combination with an engine cylinder, of a detachable head therefor, a rotary valve engaging a counterbore in the end of said cylinder, and a stamped plate clamped between said cylinder and head forming a seat for said valve and having accurately defined ports therein registering with the ports in said head.

4. The combination with the casing of a multi-cylinder engine, a detachable head therefor, valves engaging counterbores in the several cylinders of said casing, and a stamped plate clamped between said head and casing forming seats for said valves having accurately defined ports therein.

5. The combination with an engine cylinder, of a detachable head therefor, a rotary disk valve engaging a counterbore at the end of said cylinder, a peripheral packing for said valve, and a ported stamped plate intermediate said head and the end of the cylinder forming a seat for said valve.

In testimony whereof I affix my signature in presence of two witnesses.

HOWARD E. COFFIN.

Witnesses:
  LENA M. CARLE,
  D. H. PAGE.